UNITED STATES PATENT OFFICE.

GEORGES DE VIGNE, OF LILLE, FRANCE.

MANUFACTURE OF FERRO-CYANIDES.

SPECIFICATION forming part of Letters Patent No. 291,163, dated January 1, 1884.

Application filed May 23, 1883. (No specimens.)

*To all whom it may concern:*

Be it known that I, GEORGES DE VIGNE, of Lille, in the Republic of France, have invented certain Improvements in the Manufacture of Ferro-Cyanides, of which the following is a specification.

The object of the present invention is to extract from coal gas or smoke, or from any other kind of gas or smoke which may contain them, the cyanogen and hydrocyanic acid, and at the same time to convert these substances into ferro-cyanides.

The invention consists in subjecting the gas or smoke, after they have been cooled and deprived of the tarry products, to the action of a mixture of iron filings or oxide, sulphide, carbonate, or other suitable salt of iron, with an alkaline or earthy alkaline oxide, hydrate, or carbonate.

In carrying out this invention as applied to the extraction of cyanogen and hydrocyanic acid from coal-gas, I take, say, crystallized carbonate of soda and reduce it to powder, and I mix it with, say, half its volume of iron filings. The filings which I prefer to use are those obtained from working what is known as "gray cast-iron," which contains in combination the greatest proportion of carbon, sulphur, phosphorus, and selenium. Filings obtained from other kinds of iron may, however, also be used; but in this case I prefer, first, to mix therewith from one to five per cent., or in some cases even more, of sulphur, phosphorus, or selenium, which will combine with the iron and increase the proportion of sulphur, phosphorus, or selenium already contained in the metal. The iron, in the form of filings, may also be partially or entirely replaced by the sulphide of iron, the protoxide, carbonate, or other suitable salt of iron. The mixture thus formed is placed in a suitable vessel, and the gas, which, as before remarked, has been cooled and deprived of its tarry products, and in addition has, by preference, been submitted to the washing or scrubbing operation, is passed through it. The hydrocyanic acid which is contained in the gas combines with the carburets, phosphurets, and sulphurets of iron and forms cyanide of iron, which, in the presence of the carbonate of soda, is transformed immediately into ferro-cyanide of sodium. The cyanogen contained in the gas combines with the carbonate of soda and forms cyanate and cyanide of sodium, and the last named, in the presence of the iron, also gives ferro-cyanide of sodium. It is the hydrocyanic acid which causes the most sensible reaction, and I therefore prefer to treat the gas after the scrubbing operation, because during that operation nearly all the cyanogen in presence of the water used in the washing is converted into ammonia and hydrocyanic acid, the acid remaining in suspension in the gas. It will be evident, however, that the gas may be treated at any time during the manufacture without departing from my invention; but I have found the best results are obtained after scrubbing, as above explained. In like manner I prefer to use crystallized carbonate of soda in carrying out my invention, because of the quantity of water of crystallization this salt contains, as I find I obtain better results if the mixture be kept in a state of humidity than if it be dry; but I may use other alkaline or earthy alkaline carbonates, oxides, hydrates, or salts, so long as the mixture shall be kept by appropriate means in a sufficiently humid state, having regard to the nature of the carbonate, oxide, hydrate, or other salt employed. The proportions above indicated for the mixture of iron filings and carbonate of soda may be varied according to circumstances, and according to the proportions of cyanogen and hydrocyanic acid contained in the gas, which will be ascertained by testing in any convenient manner.

In order to render the mixture more permeable to the gas, I may add to it a small proportion of coke-dust, sawdust, or other suitable material. The mixture may be contained in a separate vessel, or it may be used in the purifiers in alternate layers with the ordinary purifying agent. The mixture is submitted to the action of the gas for a period varying according to the amount of cyanogen and hydrocyanic acid it contains, to ascertain which the gas is tested in any convenient manner. The mixture is afterward washed with hot or cold water, and the solution obtained, on being evaporated, gives by crystallization ferro-cyanide of sodium, which may be treated in any well-known manner to obtain other ferro-cyanides. The process, as applied to the treatment of any smoke and fumes from the combustion or imperfect distillation of coal, turf, and similar materials, is analogous to that above described. The smoke is first cooled and then washed to remove as fully as possible the tarry products, and it is then passed through the mixture of carbonate of soda and iron filings, or an equivalent mixture, which is afterward washed, and the solution is evaporated, as before mentioned.

I am aware that it is not new to obtain cyanogen by passing nitrogen gas through a mixture of coke, alkali, and iron filings, the mixture being heated to a high temperature. The iron filings are not, however, used to produce ferro-cyanide, as the high temperature would be against its formation, but are used simply to promote the conversion of nitrogen gas into cyanide, and are not absolutely essential to the result.

In my process the gas or smoke is cooled before treatment, and is subjected to the mixture while cool, as a high degree of heat would be destructive to my process by destroying the mixture.

I do not claim, broadly, the use of a mixture of iron and alkaline salt for purifying gas, nor do I claim the production of ferro-cyanides by treating ammoniacal liquor with iron and lime.

What I claim as my invention, and desire to secure by Letters Patent, is—

The process of obtaining ferro-cyanides from coal-gas or other gas or smoke containing cyanogen or hydrocyanic acid, consisting in cooling the gas or smoke and depriving it of tarry products, in subjecting the gas or smoke in a cool state to the action of a mixture of iron in any of its various forms and an alkaline salt, and in subsequently washing the mixture and evaporating the solution so obtained, substantially as and for the purpose herein described.

G. DE VIGNE.

Witnesses:
H. K. WHITE,
JOHN C. DAVIDSON,
*Both of 66 Chancery Lane, London.*